(12) United States Patent
Kummetz et al.

(10) Patent No.: US 8,156,658 B2
(45) Date of Patent: Apr. 17, 2012

(54) LINEAR ENCODER

(75) Inventors: Jens Kummetz, Traunstein (DE); Tim Boye, Waging am See (DE); Martin Seichter, Traunstein (DE); Dirk Geyermann, Nußdorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 12/924,157

(22) Filed: Sep. 21, 2010

(65) Prior Publication Data
US 2011/0067255 A1    Mar. 24, 2011

(30) Foreign Application Priority Data
Sep. 23, 2009   (DE) .................. 10 2009 044 917

(51) Int. Cl.
G01B 11/04    (2006.01)
G01B 21/06    (2006.01)

(52) U.S. Cl. ............... 33/707; 33/702; 33/706

(58) Field of Classification Search ........... 33/707, 33/702, 706, 708
See application file for complete search history.

(56) References Cited

U.S. PATENT DOCUMENTS

| | | | |
|---|---|---|---|
| 4,559,707 A * | 12/1985 | Oberhans | 33/702 |
| 4,912,856 A * | 4/1990 | Ernst | 33/702 |
| 5,065,525 A * | 11/1991 | Szenger | 33/702 |
| 5,987,768 A * | 11/1999 | Freitag et al. | 33/706 |
| 6,349,481 B1 * | 2/2002 | Nelle | 33/702 |
| 6,532,681 B2 * | 3/2003 | Tondorf | 33/706 |
| 6,571,486 B1 | 6/2003 | Tondorf et al. | |
| 6,637,118 B2 * | 10/2003 | Feichtinger | 33/1 PT |
| 6,742,274 B2 * | 6/2004 | Kawada | 33/702 |
| 6,931,741 B2 * | 8/2005 | Nakamura et al. | 33/306 |
| 7,549,234 B2 * | 6/2009 | Holzapfel et al. | 33/706 |
| 7,934,324 B2 * | 5/2011 | Tomiya et al. | 33/706 |

FOREIGN PATENT DOCUMENTS
EP     1 004 855 B1    5/2006

* cited by examiner

*Primary Examiner* — Christopher Fulton
(74) *Attorney, Agent, or Firm* — Brinks Hofer Gilson & Lione

(57) ABSTRACT

A linear encoder that includes a scale supporting a measurement graduation and an assembly that includes a support. The scale is fastened on the assembly by a fastener, wherein the fastener has a structure that makes a temperature-dependent linear expansion of the support in relation to the scale possible in case of temperature changes. The linear encoder includes a holder in a position in a measuring direction, wherein the holder fastens the scale to a body to be measured by the linear encoder at a fixed point while bypassing the support. In addition, the assembly is fastened by the support on the body to be measured by the linear encoder.

26 Claims, 5 Drawing Sheets

LINEAR ENCODER

RELATED APPLICATIONS

Applicants claim, under 35 U.S.C. §119, the benefit of priority of the filing date of Sep. 23, 2009 of a German patent application, copy attached, Ser. No. 10 2009 044 917.5, filed on the aforementioned date, the entire contents of which is incorporated herein by reference.

BACKGROUND

1. Technical Field

The present invention relates to a linear encoder having an assembly that includes a support on which a scale supporting a measurement graduation is fastened by a fastener. The fastener is embodied in such a way that in case of temperature changes a temperature-dependent linear expansion of the support in relation to the scale is made possible, and wherein the assembly can be fastened by the support on a body to be measured.

2. Background Information

An example of a linear encoder is described in EP 1 004 855 B1. The linear encoder is employed for measuring lengths, as well as travel distances, and is employed in particular in processing machinery for measuring the relative movements of a tool in relation to a workpiece to be processed, in coordinate-measuring machinery, and increasingly in the semiconductor industry.

The linear encoder has an assembly that includes a support and a scale. The support is provided for stabilizing the scale and thereby making it easier to manipulate the scale. For attaching the scale to a body to be measured, the support has a fastener on the body to be measured. For example, the scale can include bores to be used in conjunction with screws for screwing the scale to the body to be measured. The support includes a material whose coefficient of expansion differs from that of the scale. The scale is attached to the support by fasteners in order to allow a displacement as free as possible of friction between the support and the scale, caused by temperature changes as a result of different linear expansions of the support and the scale.

The scale is rigidly connected with the support at a single location, also called a fixed point. This rigid coupling takes place by a positive connection, wherein positive connection is known in the art as "form closure." In this position (viewed in the measuring direction) a rigid fastening of the support on the body to be measured is also provided.

This type of construction has the disadvantage that distortions of the support, for example during screwing the support to the body to be measured, or in case of temperature changes, can result in a displacement of the fixed point, which results in inaccurate measurements.

OBJECTS AND SUMMARY OF THE INVENTION

An object of the present invention therefore is to create an easily manipulatable and stable linear encoder, which displays a high degree of accuracy.

This object is attained in accordance with the present invention by a linear encoder that includes a scale supporting a measurement graduation and an assembly that includes a support. The scale is fastened on the assembly by a fastener, wherein the fastener has a structure that makes a temperature-dependent linear expansion of the support in relation to the scale possible in case of temperature changes. The linear encoder includes a holder in a position in a measuring direction, wherein the holder fastens the scale to a body to be measured by the linear encoder at a fixed point while bypassing the support. In addition, the assembly is fastened by the support on the body to be measured by the linear encoder.

In accordance with the present invention, the linear encoder has an assembly including a scale fastened to a support. The scale is fastened to the support with the aid of a fastener, which is embodied in such a way that, in case of temperature changes, a linear expansion of the support in relation to the scale is made possible in the measuring direction in as friction-free, and therefore as force-free, a manner as possible, but wherein the scale and the support can nevertheless be manipulated as a common assembly. Here, the support stabilizes the scale. The assembly can be fastened on a body to be measured, in that the support has a fastener for fastening it on this body to be measured. In particular, the fastener can be screws.

The fastener, which seats the scale on the support displaceably in the measuring direction, preferably is an intermediate layer, which maintains the scale on the support by adhesion. This intermediate layer is for example embodied as a film of a liquid, over which the scale is pulled against a surface of the support by capillary action.

A thermal zero point defines a position of the scale that stays unchanged by temperature variations. To form such a thermal zero point, the linear encoder has a holding device, by which the scale can be fastened to the body to be measured at a fixed point, while bypassing the support. In this case, bypassing the support means that the holding device does not touch the support, and does not exert any constraining forces, such as clamping forces between the scale and the support. The scale is also supported and maintained on the support with the interposition of the fastener, wherein the fastener is resilient in the measuring direction, at the position of the fixed point as viewed in the measuring direction. A particularly stable and vibration-resistant structure results if the resilient fastener is an intermediate layer, which maintains the scale over its entire length, including the fixed point, resiliently adhering flat against the support, so that the support holds the scale over the entire length, including the fixed point.

It should be noted that for forming a thermal zero point of the scale, the scale must be fixed to the body to be measured at only a single point as viewed in the measuring direction. At all other locations the scale must be fastened on the body to be measured disengaged in the measuring direction.

On the one hand, the holder is connected with the scale in a stationary way at the fixed point of the latter, in particular by lateral clamping at oppositely located longitudinal sides of the scale, and on the other hand the holder can in turn be fixed in place in a stationary manner on the body to be measured.

The structure is particularly advantageous when the scale is made of a material with so-called zero expansion, i.e., of a material having a thermal linear expansion coefficient of less than $0.1 \times 10^{-6}$ $K^{-1}$, and when in contrast thereto the support has a larger thermal linear expansion coefficient. Here, it is taken into consideration that

- a highly precise and temperature-stable position measurement is achieved, if the measurement graduation is installed on a temperature-stable scale,
- a stabilization of the scale by a support made of a cost-efficient material has been achieved,
- the thermal expansion coefficient of the support is matched to the thermal expansion coefficient of the body to be measured.

Further details and advantages of the present invention will be explained by the following description of an exemplary embodiment in connection by the attached drawing figures.

BRIEF DESCRIPTION OF THE DRAWINGS

Shown are in.

DETAILED DESCRIPTION OF THE PREFERRED EMBODIMENTS

Figure 1:
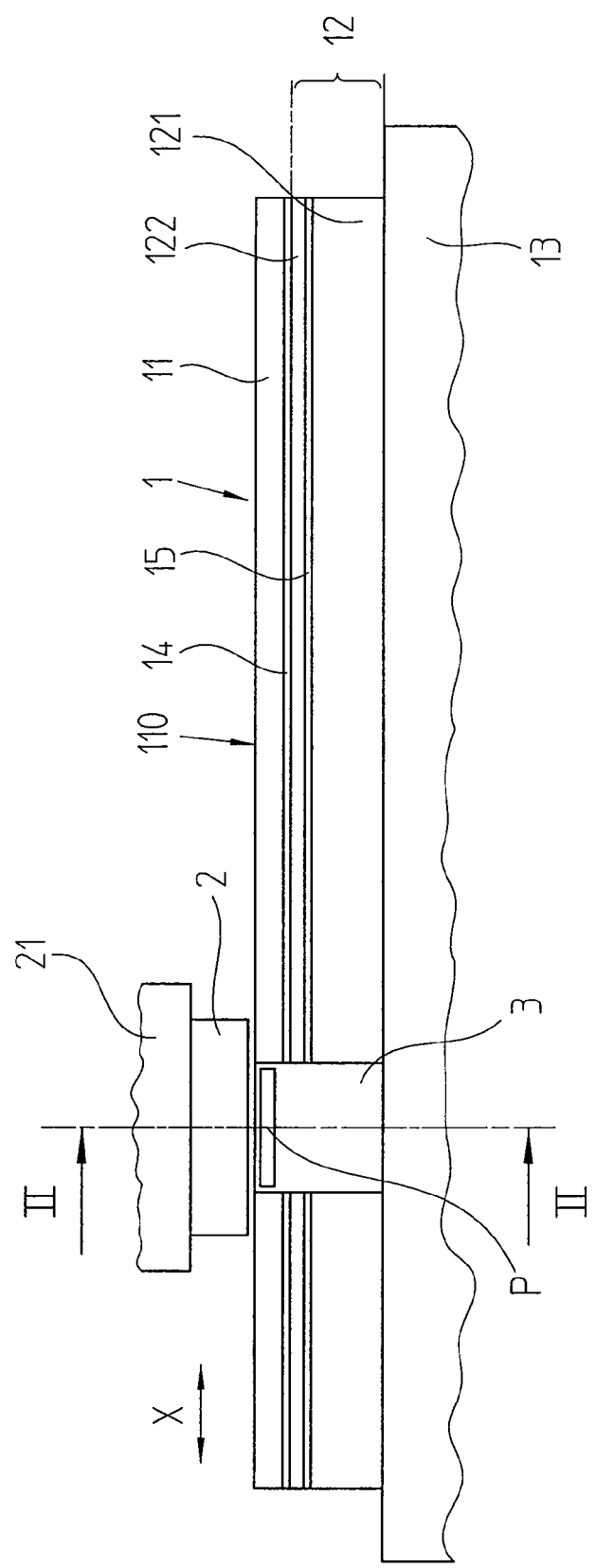
FIG. 1 shows a side view of a first embodiment of a linear encoder in accordance with the present invention.
Figure 2:
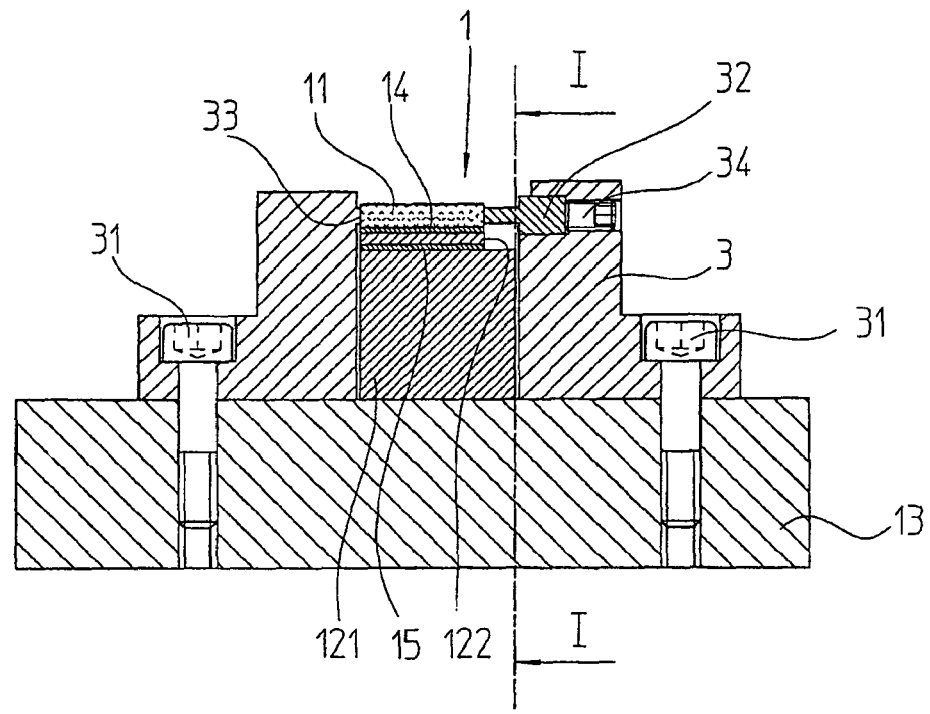
FIG. 2 is a cross-sectional view of the linear encoder of FIG. 1 as viewed along line II-II of FIG. 1.

A first exemplary embodiment of the present invention is represented in detail in FIGS. 1 to 4. Here, FIG. 1 shows a view of the linear encoder extending in the measuring direction X, namely a longitudinal sectional view I-I of the view in FIG. 2. FIG. 2 shows a cross section II-II of this linear encoder in accordance with FIG. 1 without a scanning unit.

The linear encoder includes a first assembly 1 with a scale 11 attached to a support 12. The linear encoder further includes a second assembly, hereinafter called scanning unit 2. For position measuring in the measuring direction X, the first assembly 1 is fastened by the support 12 on a first body to be measured, for example the bed of a machine tool. The scanning unit 2 is fastened on a second body 21 to be measured, for example the carriage of a machine tool. In this case, the scanning unit 2 can be displaced in relation to the first assembly 1 in the measuring direction X.

The scale 11 includes a material with a negligible thermal expansion coefficient $\alpha$, wherein $\alpha$ lies in the temperature range between 0° to 50°, preferably less than $0.1 \times 10^{-6}$ $K^{-1}$. Such a material is in particular glass with a so-called zero expansion. Examples of such glass are known in the trade by the commercial names ZERODUR, SITALL and ULE. In comparison to metals, this glass has the advantage that by customary manufacturing methods it is possible by customary manufacturing methods to create a satisfactory optical surface, to which an optically scannable measurement graduation 110 can be applied.

In the example, this scale 11 has on its upper surface a photo-electrically scannable measurement graduation 110 in the form of a ruled grating, which can be scanned under incident light and has a graduation period as measured in nanometers. This measurement graduation 110 is a reflecting phase grating, or it includes reflecting and non-reflecting areas alternatingly arranged in the measuring direction X. For position measuring, this measurement graduation 110 is scanned by the scanning unit 2, which is only schematically represented.

The scale 11 is fastened on the support 12 by a first fastener which is embodied in such a way that a linear expansion of the support 12 in relation to the scale 11 is made possible without hindrance. Advantageously, the fastener is a viscous intermediate layer of low shear strength in the measuring direction X, by which the scale 11 is maintained adhering to the support 12. In the example represented, the viscous intermediate layer is a liquid film 14 over which the scale 11 is pulled by capillary action against a surface of the support 12. In addition, the scale 11 rests flat on the liquid film 14. While on the one hand the liquid film 14 securely holds the scale 11 on the support 12, the liquid film 14 permits, on the other hand, displacements of the support 12 in relation to the scale 11, caused by temperature-related length changes, in a frictionless, and therefore free of forces, manner. Silicon oil is particularly suitable as the material for the liquid film 14.

In the example, the support 12 is rigid and is constructed in a sandwich-like or layered manner, i.e., includes several support elements arranged on top of each other, in particular a first support element 121 and a second support element 122. The first support element 121 is embodied to be inherently stable and rigid and is made of metal, in particular steel, with a thermal expansion coefficient $\alpha$ in the temperature range between 0° and 50° of approximately $12 \times 10^{-6}$ $K^{-1}$. The first support element 121 can be fastened on the first body 13 to be measured, for example by screwing or adhesion. To this end, the first support element 121 has, on its side facing the body 13 to be measured, a fastening surface extending over the measuring length, with which it can be fixed over a large surface, and therefore vibration-resistant, on the body 13 to be measured.

A second support element 122 is fastened on the first support element 121 by a second fastener. In an advantageous manner, the second fastener again is constituted by a viscous intermediate layer of low shear resistance in the measuring direction X. An example of a viscous intermediate layer is a highly elastic adhesive 15. The second support element 122 functions as an intermediate support and constitutes the contact face for the liquid film 14. For this purpose, the second support element 122 is a glass lamella, for example float glass, of a thermal expansion coefficient $\alpha$ in the temperature range between 0° and 50° of approximately 7 to $9 \times 10^{-6}$ $K^{-1}$. The employment of a scale 11 made of glass, or respectively glass ceramics, and of a second support 122 made of glass, is particularly advantageous, because having the liquid film 14 between the two glass surfaces 11, 122 allows the scale 11 to be seated in a particularly homogeneous full-contact manner, and therefore secures the scale against vibrations, which increases the measurement accuracy of the scale.

The sandwich-like structure of the support 12 also has the advantage that different linear expansions, caused by temperature changes, need not be compensated exclusively by a single fastener. For this purpose, the thermal expansion coefficients of the materials used, starting with the scale 11 up to the first support element 121, are gradually stepped. This means that the thermal expansion coefficient of the scale 11 is less than the thermal expansion coefficient of the second support element 122, and the thermal expansion coefficient of the second support element 122 is again less than the thermal expansion coefficient of the first support element 121. Different linear expansions between the scale 11 and the second support element 122 are compensated in a friction-free manner by the first fastener, for example in the form of the intermediate layer, in particular the liquid film 14. Different linear expansions between the second support element 122 and the first support element 121 are compensated by the second fastener, for example in the form of the intermediate layer, in particular the elastic adhesive 15.

However, in a manner not illustrated, the support 12 can also be embodied as a single piece.

To form a so-called thermal zero point of the scale 11, the scale 11 can be attached to the body 13 to be measured by a holder 3, for example by screws 31 and/or pins, at a fixed point P. The holder 3 is embodied in such a way that, on the one hand, the scale 11 alone is fixed in place at the fixed point P and, on the other hand, the holder 3 can also be fixed in place in a position on the body 13 to be measured in the measuring direction X, while bypassing the support 12. Thus, the holder 3 constitutes a sort of bypass from the scale, starting at the body 13 to be measured. Because of this construction, the decoupling, acting in the measuring direction X, between the scale 11 and the support 12, in the example provided by the liquid film 14, is also maintained at the fixed point P. To this end, the holder 3 is embodied in such a way that it does not touch the support 12 and does not exert any constraining forces, such as clamping forces, between the scale 11 and the support 12. Because of this step, a thermally stable fixed point is created in the measuring direction X between the scale 11 and the object 13 to be measured, which is completely decoupled from the support 12.

As the cross section in FIG. 2 shows, it is particularly advantageous if fastening of the holder 3 takes place by at least one screw 31 or a pin at the same location, as viewed in the measuring direction X, as the fixation of the scale 11 with the holder 3.

The scale 11 is fixed in place on the holder 3 at the fixed point P, and the holder 3 is arranged on the side next to the support 12, extending toward the body 13 to be measured. To avoid constraining forces on the support 12, the holder 3 also extends laterally spaced apart from the support 12. The term "laterally" defines a direction perpendicularly in regard to the measuring direction X and laterally to the direction in which the scale 11, intermediate the layer 14 and the support 12 are arranged on top of each other.

Viewed in the measuring direction X, the scale 11 is also supportively maintained on the support 12 at the position of the fixed point P by the adhesively embodied intermediate layer in the form of a liquid film 14. This results in a particularly stable and vibration-free structure, since the scale 11 is maintained on the support 12 flush over it entire length, including the fixed point P, so that the support 12 supports the scale 11 over its entire length, including the fixed point P.

The fixation in place of the holder 3 with the scale 11 takes place by a frictional connection in that it is clamped at its two sides extending parallel to each other. This clamping of the scale 11 is realized in that a clamping element 32 acts on one of the long sides of the scale 11 and urges the opposite side of the scale 11 against a stop 33. The clamping element 32 is embodied as a slide, which can be displaced transversely with respect to the measuring direction X by at least one screw 34 in order to clamp the scale 11 in place on the holder 3 by clamping it against oppositely located sides.

Figure 3:
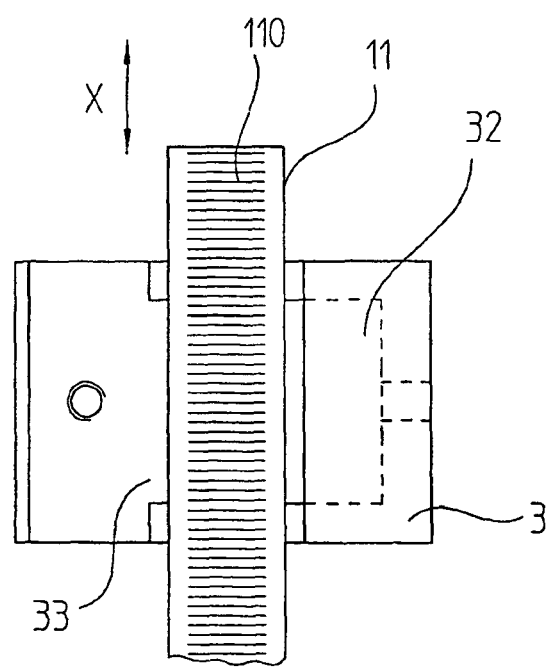
FIG. 3 is a schematic view from above of the linear encoder of FIG. 1.

FIG. 3 schematically shows a view from above on the above described linear encoder.

Figure 4:
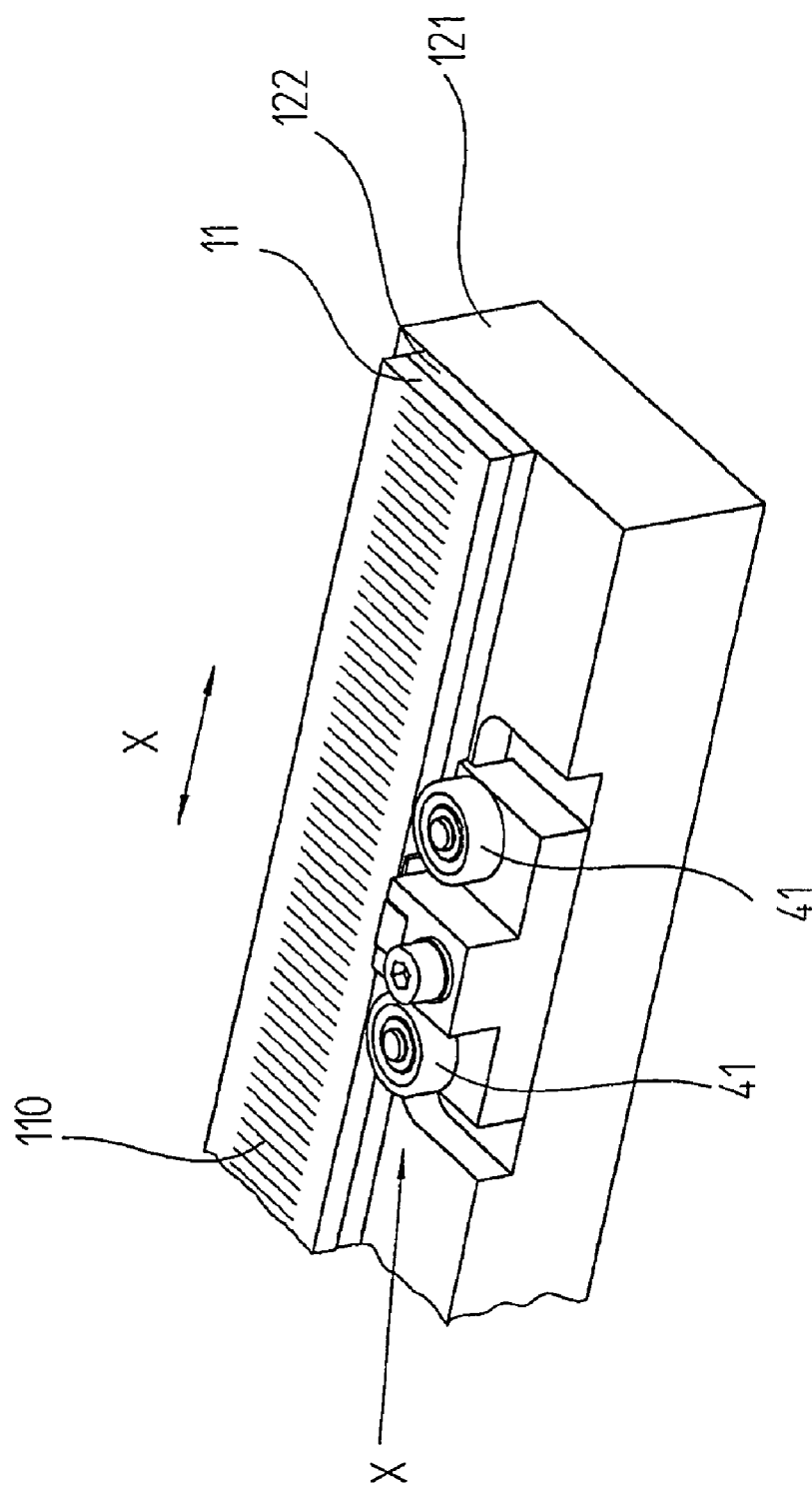
FIG. 4 is a perspective view of the linear encoder of FIG. 1.

FIG. 4 schematically shows a perspective projection of the linear encoder at a location which is arranged spaced apart in the measuring direction from the fixed point, not represented here. Represented is the component 1, which includes the support 12, i.e., the first support element 121 and the second support element 122, as well as the scale 11. For reasons of clarity, the intermediate layers 14 and 15 have not been represented. A bearing 4 of the scale 11 is arranged remote from the fixed point in the measuring direction X. In the example, this bearing 4 includes a roller bearing with guide rollers 41, which contact the scale 11 on a long side, so that a positional change of the scale 11 in relation to the support 12 as free of friction as possible is provided. Thus, the bearing 4 constitutes a low-friction linear guidance between the support 12 and the scale 11. For aligning the scale 11, it is possible to provide a pressing force to urge the scale 11 against the guide rollers 41. In a known manner, this pressing force can be generated by the force of a spring or by magnetic force, such as described in EP 1 004 855 B1, for example.

In what follows, alternatives of the above form of embodiment will be described in greater detail, in which the same reference numerals will be used for the respective parts of scale, support, fixed point and holder as in the above explained exemplary embodiment, since the structure does not differ in this respect.

Alternatively to a non-positive connection (also known in the art as "frictional connection") between the scale 11 and the holder 3 at the fixed point P, it is also possible to realize a material-to-material or a positive connection for a fixation in place.

Figure 5:
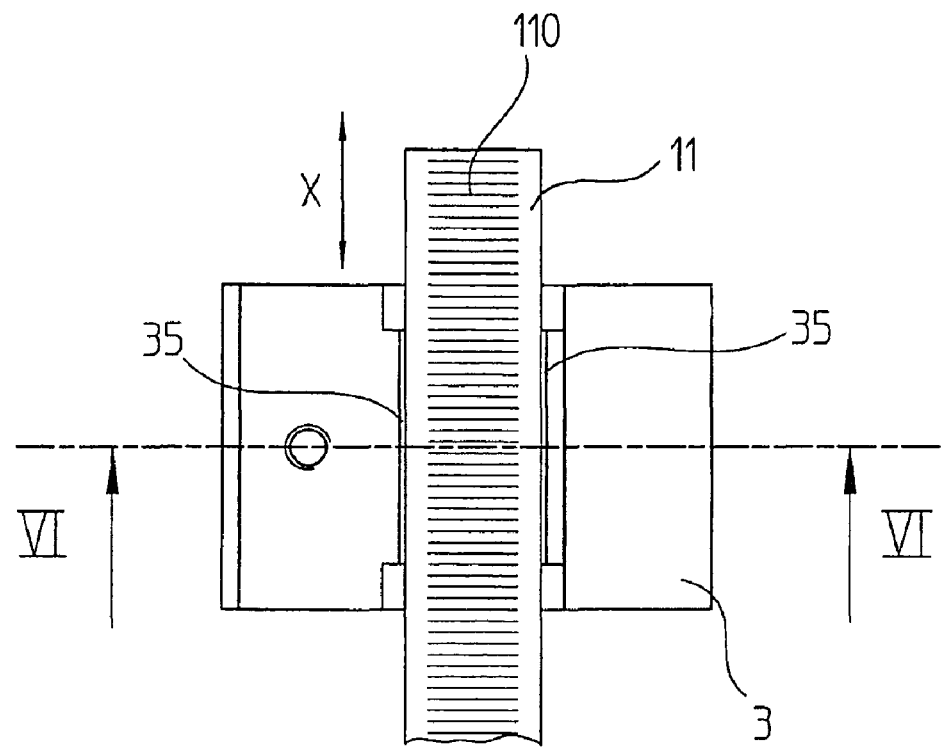
FIG. 5 is a view from above of a second embodiment of a linear encoder at the location of a fixed point with material-to-material contact in accordance with the present invention.
Figure 6:
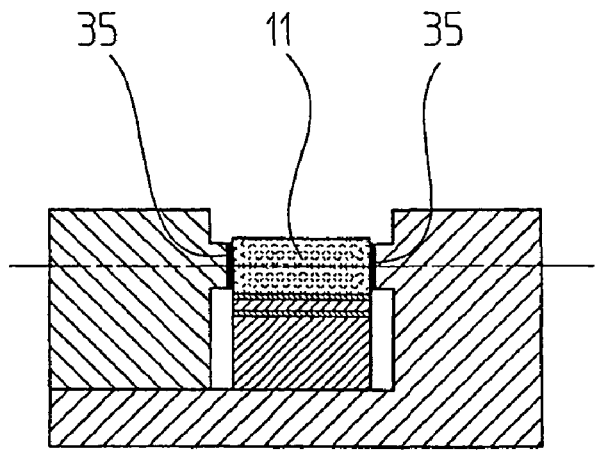
FIG. 6 is a cross-sectional view of the linear encoder of FIG. 5 as viewed along line VI-VI of FIG. 5.

FIGS. 5 and 6 schematically represent a material-to-material connection in that the scale 11 is fixed in place at the fixed point P on the holder 3 by an adhesive 35, and the holder 3 in turn can be fastened on the body 13 to be measured by bypassing the support 12.

Figure 7:
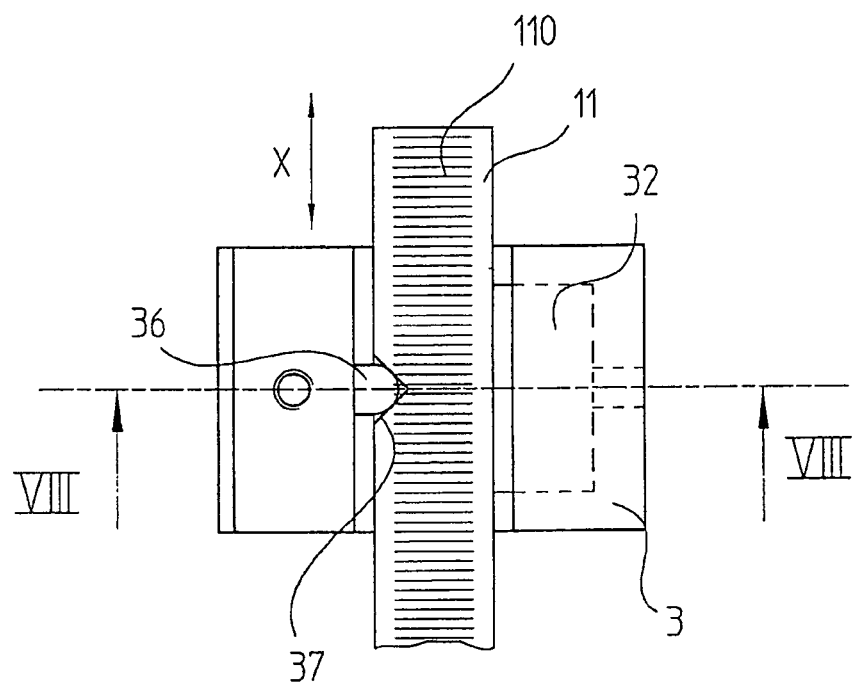
FIG. 7 is a view from above of a third embodiment of a linear encoder at the location of a fixed point with positive connection in accordance with the present invention.
Figure 8:
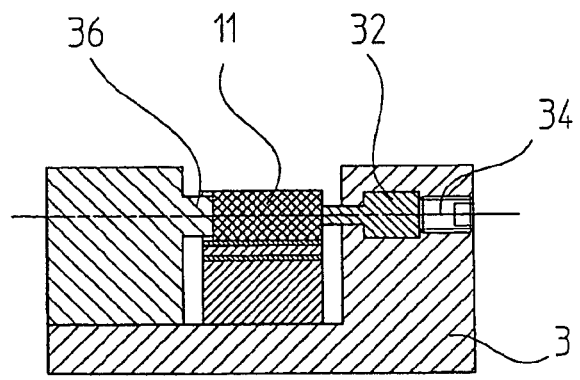
FIG. 8 is a cross-sectional view of the linear encoder of FIG. 7 as viewed along line VIII-VIII of FIG. 7.

FIGS. 7 and 8 schematically show a positive connection in that the scale 11 is fixed in place at the fixed point P by a material-to-material engagement with the holder 3, and the holder 3 can in turn be fixed in place on the body 13 to be measured, while bypassing the support 12. In the example, a projection 36 of the holder 3 engages a depression 37 of the scale 11. The positive connection thus generated acts in a manner in which it provides a fixation in place in the measuring direction X.

In connection with all embodiments of the fixation in place of the holder 3 on the scale 11 it is particularly advantageous if the fixation takes place at both long sides of the scale 11 symmetrically with respect to the center of the scale 11 and the measurement graduation 110. Thus, the retaining forces of the local connection act symmetrically on the scale 11.

It is furthermore advantageous if the fixation in place of the holder 3 on the scale 11 in relation to the height of the scale 11 takes place centered, i.e. in the neutral plane of the scale 11.

The foregoing description is provided to illustrate the present invention, and is not to be construed as a limitation. Numerous additions, substitutions and other changes can be made to the present invention without departing from its scope as set forth in the appended claims.

We claim:

1. A linear encoder comprising:
   a scale supporting a measurement graduation;
   an assembly comprising a support, wherein said scale is fastened on said assembly by a fastener, wherein said fastener has a structure that makes a temperature-dependent linear expansion of said support in relation to said scale possible in case of temperature changes;
   a holder in a position in a measuring direction, wherein said holder fastens said scale to a body to be measured by said linear encoder at a fixed point while bypassing said support; and
   wherein said assembly is fastened by said support on said body to be measured by said linear encoder.

2. The linear encoder in accordance with claim 1, wherein said support has a thermal expansion coefficient which differs from a thermal expansion coefficient of said scale.

3. The linear encoder in accordance with claim 2, wherein said scale comprises a material having a thermal expansion coefficient of less than $0.1 \times 10^{-6} K^{-1}$, and in contrast thereto said support has a thermal linear expansion coefficient that is greater than $0.1 \times 10^{-6} K^{-1}$.

4. The linear encoder in accordance with claim 3, wherein said support comprises a first support element and a second support element, which are connected with each other in such a way that in case of temperature changes a linear expansion between said first support element and said second support element is made possible, wherein said thermal linear expansion coefficient of said first support element, which is connected with said scale, is less than the thermal expansion coefficient of said support, which is fastened on said body to be measured.

5. The linear encoder in accordance with claim 1, wherein said fastener is an intermediate layer by which said scale is maintained adhesively on said support.

6. The linear encoder in accordance with claim 5, wherein said scale is maintained, adhering flat to said support, over an entire length, inclusive of said fixed point, by said intermediate layer, so that said support supports said scale over said entire length, inclusive of said fixed point.

7. The linear encoder in accordance with claim 1, wherein said intermediate layer comprises a liquid film.

8. The linear encoder in accordance with claim 1, wherein said scale is fixed in place on said holder at said fixed point, and said holder is arranged laterally next to said support and extending, laterally distanced from said support, in relation to said body to be measured.

9. The linear encoder in accordance with claim 1, wherein said holder is embodied in such a way that at said fixed point, said holder exerts a positive connection between said scale and said holder.

10. The linear encoder in accordance with claim 1, wherein said holder has a structure so that at said fixed point, said holder exerts a non-positive connection between said scale and said holder.

11. The linear encoder in accordance with claim 1, wherein said holder has a structure so that at said fixed point, said holder causes a material-to material connection between said scale and said holder.

12. The linear encoder in accordance with claim 1, wherein said measurement graduation is photo-electrically scannable.

13. The linear encoder in accordance with claim 12, wherein said measurement graduation is a ruled grating and is selected from the group consisting of a reflecting phase grating or a grating that includes reflecting and non-reflecting areas alternatingly arranged in a measuring direction.

14. A linear encoder comprising:
    a scanning unit that generates light;
    a scale supporting a measurement graduation that receives said light, wherein
    said scanning unit moves relative to said scale in a measuring direction;
    an assembly comprising a support, wherein said scale is fastened on said assembly by a fastener, wherein said fastener has a structure that makes a temperature-dependent linear expansion of said support in relation to said scale possible in case of temperature changes;
    a holder in a position in a measuring direction, wherein said holder fastens said scale to a body to be measured by said linear encoder at a fixed point while bypassing said support; and
    wherein said assembly is fastened by said support on said body to be measured by said linear encoder.

15. The linear encoder in accordance with claim 14, wherein said support has a thermal expansion coefficient which differs from a thermal expansion coefficient of said scale.

16. The linear encoder in accordance with claim 15, wherein said scale comprises a material having a thermal expansion coefficient of less than $0.1 \times 10^{-6} K^{-1}$, and in contrast thereto said support has a thermal linear expansion coefficient that is greater than $0.1 \times 10^{-6} K^{-1}$.

17. The linear encoder in accordance with claim 16, wherein said support comprises a first support element and a second support element, which are connected with each other in such a way that in case of temperature changes a linear expansion between said first support element and said second support element is made possible, wherein said thermal linear expansion coefficient of said first support element, which is connected with said scale, is less than the thermal expansion coefficient of said support, which is fastened on said body to be measured.

18. The linear encoder in accordance with claim 14, wherein, said fastener is an intermediate layer by which said scale is maintained adhesively on said support.

19. The linear encoder in accordance with claim 18, wherein said scale is maintained, adhering flat to said support, over an entire length, inclusive of said fixed point, by said intermediate layer, so that said support supports said scale over said entire length, inclusive of said fixed point.

20. The linear encoder in accordance with claim 14, wherein said intermediate layer comprises a liquid film.

21. The linear encoder in accordance with claim 14, wherein said scale is fixed in place on said holder at said fixed point, and said holder is arranged laterally next to said support and extending, laterally distanced from said support, in relation to said body to be measured.

22. The linear encoder in accordance with claim 14, wherein said holder is embodied in such a way that at said fixed point, said holder exerts a positive connection between said scale and said holder.

23. The linear encoder in accordance with claim 14, wherein said holder has a structure so that at said fixed point, said holder exerts a non-positive connection between said scale and said holder.

24. The linear encoder in accordance with claim 14, wherein said holder has a structure so that at said fixed point, said holder causes a material-to material connection between said scale and said holder.

25. The linear encoder in accordance with claim 14, wherein said measurement graduation is photo-electrically scannable.

26. The linear encoder in accordance with claim 25, wherein said measurement graduation is a ruled grating and is selected from the group consisting of a reflecting phase grating or a grating that includes reflecting and non-reflecting areas alternatingly arranged in the measuring direction.

* * * * *